April 18, 1972  A. LAGRANGE ETAL  3,657,131
MAGNETIC GARNETS
Filed April 13, 1970  2 Sheets-Sheet 1

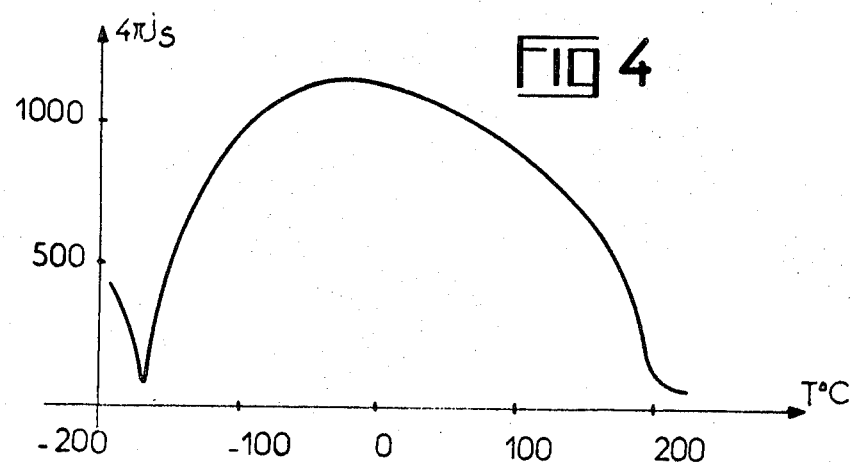
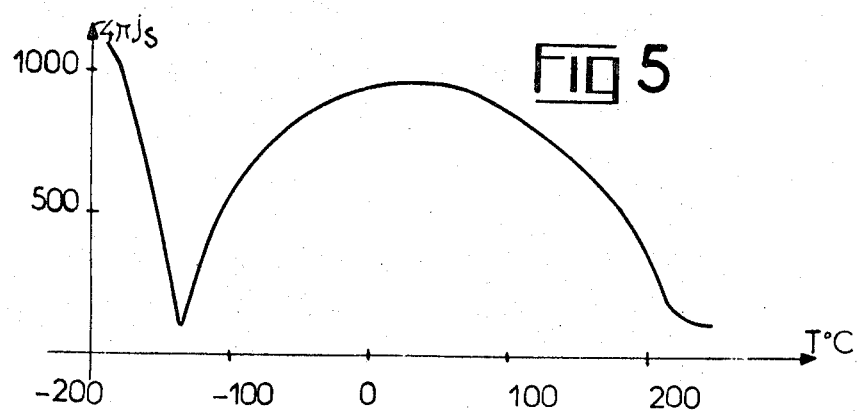
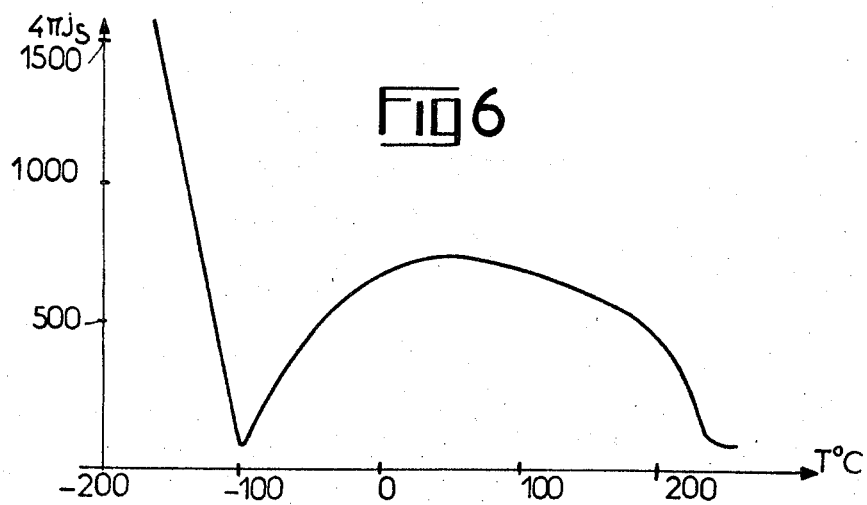

United States Patent Office 3,657,131
Patented Apr. 18, 1972

---

3,657,131
MAGNETIC GARNETS
Alain Lagrange, Jean Nicolas, and Roland Sroussi, Paris, France, assignors to CSF Thomson, Paris, France
Filed Apr. 13, 1970, Ser. No. 27,769
Claims priority, application France, Apr. 17, 1969, 6911989
Int. Cl. C04b 35/00
U.S. Cl. 252—62.57    2 Claims

---

ABSTRACT OF THE DISCLOSURE

Magnetic materials of garnet structure and having compositions corresponding to the general formula:

$$Y_{3-3x-y}Gd_{3x}Ca_yFe_{5-y}Sn_yO_{12}$$

where $$0.5 \leqslant x \leqslant 0.85$$
$$0.1 \leqslant y \leqslant 0.5$$

and intended in particular for ultra-high frequency applications.

---

The present invention relates to novel magnetic materials of garnet-type crystallographic structures, generally used in ultra-high frequency applications.

Already, garnet materials of the kind have been produced for such applications.

Garnets of the formula:

$$Y_{3-3x}Gd_{3x}Fe_{5-5y}Al_{5y}O_{12}$$

are widely used but their characteristics are inadequate for some applications. Other materials derived from these by replacing the aluminium with indium, have the formula:

$$Y_{3-3x}Gd_{3x}Fe_{5-5y}In_{5y}O_{12}$$

These have better characteristics but they have other drawbacks. The introduction of indium increases the sintering temperature; indium is expensive. Consequently, these materials are difficult to produce and they are costly.

The object of the present invention is to produce garnet compositions not exhibiting these drawbacks while having improved characteristics.

The garnets in accordance with the invention are characterized by the introduction of calcium and tin; their composition is preferably in accordance with the general formula:

$$Y_{3-3x-y}Gd_{3x}Ca_yFe_{5-y}Sn_yO_{12}$$

where:

$$0.5 \leqslant x \leqslant 0.85$$
$$0.1 \leqslant y \leqslant 0.5$$

Figure 1:
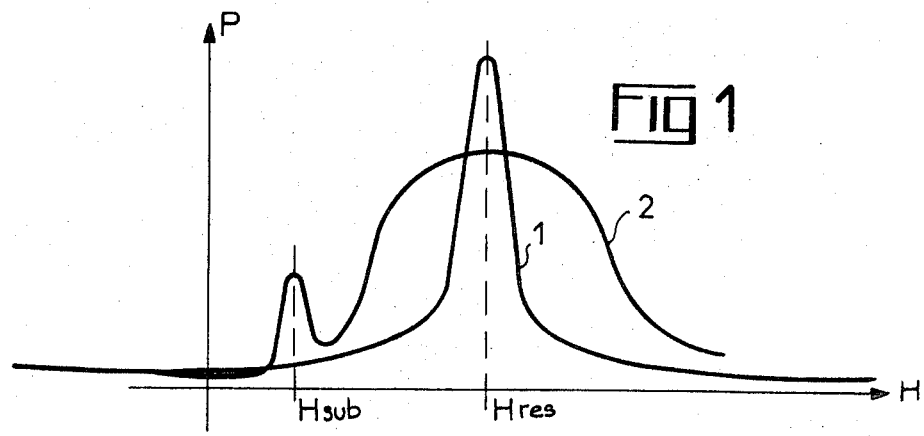
Figure 2:
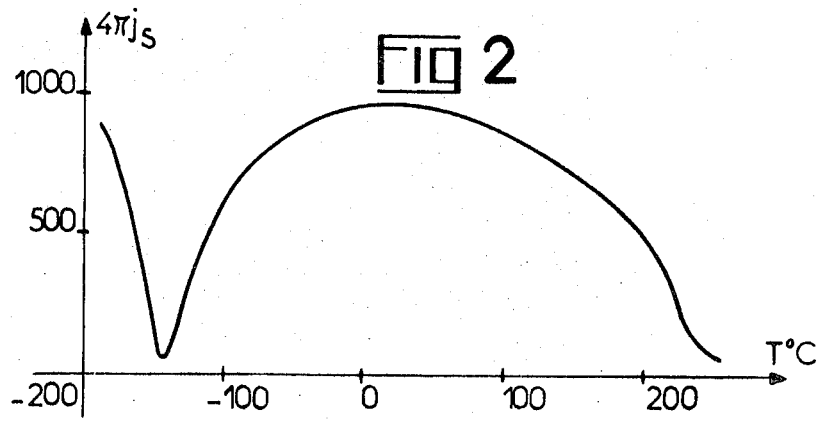
Figure 3:
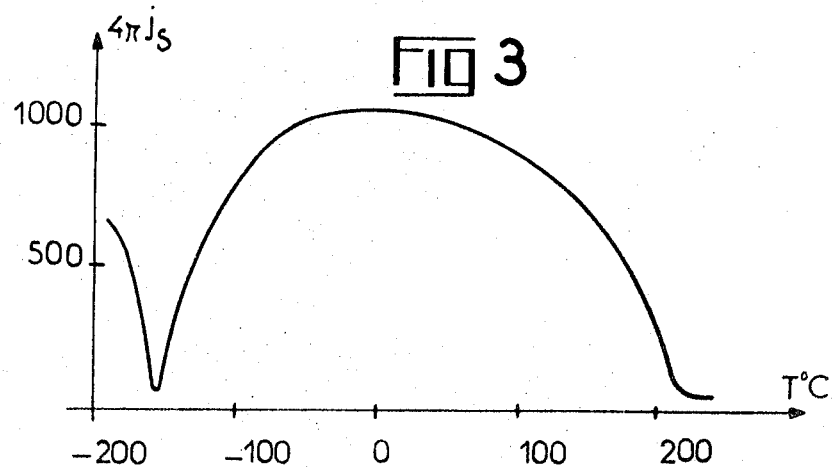

The invention will be better understood from a consideration of the ensuing description and by reference to the attached drawings in which:

FIG. 1 is an explanatory diagram;
FIGS. 2 to 6 are graphs characteristic of the materials used.

Those skilled in the art will be well aware that the ultra-high frequency operation of a magnetic material requires the following qualities:

A magnetization at saturation which is appropriate to the use.

A very high stability in said magnetization, which should exhibit little variation as a function of temperature.

Very low dielectric losses at the operating frequency.
A narrow resonance spectrum line.
Good stability at mean and peak power.

FIG. 1 shows what is intended by these latter two characteristics. The figure shows graphs plotting the variation in the magnetic losses P of a magnetic material as a function of a static bias field H, perpendicular to the ultra-high frequency magnetic field, for a given frequency of the latter; each of these graphs corresponds to a different amplitude on the part of the ultra-high frequency magnetic field.

For a ultra-high frequency magnetic field of amplitude below a certain value $h_c$ (graph 1), it will be seen that for a certain value of H, $H_{res}$ (static field corresponding to gyromagnetic resonance) the losses pass through a sharp maximum.

There is no other maximum (if the frequency is properly chosen).

For $h > h_c$, graph 2, another maximum appears for a magnetic static field $H_{sub}$, $H_{sub} < H_{res}$ and the maximum for $H_{res}$ is much broader.

In order to avoid this subsidiary resonance phenomenon and this widening of the resonance curve, it is necessary for $h$ to be less than $h_c$. This limits the amplitude of the ultra-high frequency wave and consequently the useful power. It is therefore necessary that $h_c$, the critical field, should be as large as possible.

Progress in relation to the known materials can for example be defined as follows:

For a given magnetic moment and for dielectric losses of the same order, one material is better than another if its resonance spectrum line is narrower for the same temperature coefficient of the magnetization and the same $h_c$ value, or if its temperature coefficient is smaller, the width of the resonance spectrum line being the same.

The materials in accordance with the invention exhibit such progress in relation to the known materials.

The materials in accordance with the invention are manufactured as follows:

First method:

Basic materials (for example iron oxide, yttrium oxide, gadolinium oxide, calcium carbonate, tin oxide) of high purity, are chosen.

($\geqslant 99.95\%$ for oxides of Y and Gd).

These materials are weighed and mixed in accordance with the general formula:

$$Y_{3-3x}Gd_{3x}Ca_yFe_{5-5\epsilon-y}Sn_yO_{12}$$

$x$ and $y$ being within the limits hereinbefore defined.

$\epsilon$ is chosen to take account of the iron introduced during mixing and crushing and is normally comprised between 0.02 and 0.05.

The thus weighted products are mixed with water in steel vessels and then crushed or pulverised using steel balls, for a period of 24 hours. The resultant product is then dried, screened, then fired in an oxidizing atmosphere at a temperature of between 1100° and 1200° C. for a time of between half-an-hour and two hours; the resultant product is crushed in steel vessels using steel balls and mixed with water, for a period of 48 hours. It is then dried, screened, and mixed with an organic binder such as polyvinyl alcohol. This product is screened again in order to obtain a granulate suitable for introduction into press moulds, pressed into the appropriate shape under a pressure of 1 ton per sq. cm. The semi-manufactures, after drying, are treated in a furnace at a temperature comprised between 1400° and 1500° C., and preferably of about 1460° C. and in an oxidizing atmosphere, for a period of 2 hours at least. In one such process, $\epsilon$ was selected at 0.035.

Second method:

A variant form of the preceding method consists in excluding the firing phase. The starting point is a mixture of the basic materials. The organic binder is introduced and the granulate is formed, after which the sintering operation is carried out under conditions identical to those described in the first method.

The table hereinafter lists some embodiments of the present invention.

In this table, $4\pi j_s$ is the saturation magnetization in gauss, $j_s$ being the corresponding value in electromagnetic c.g.s. units, measured in a field of 7000 oe. at ambient temperature. $\Delta H$ is the width of the gyro resonance spectrum line, measured on a spherical specimen placed in a resonator at 9500 mc. and at a low ultra-high frequency level.

$$\alpha_a^b$$

is the temperature coefficient defined as the ratio of the difference between the maximum and minimum values of magnetization within a temperature range comprised between $a$ and $b$ degrees centigrade, and the value of the magnetization at ambient temperature (which is within the range considered).

$G'_{eff}$ is the effective gyromagnetic factor, given by the formula $$f_{res} = 1{,}4 G_{eff} H_{res}$$

where $f_{res}$ is the resonance frequency in c./s. and $H_{res}$ is measured in oersteds.

| Example | $4\pi js$(g.) | $\Delta H$(oe.) | $G°_{eff}$ | α+80, −40 in percent | α in percent | x | y |
|---|---|---|---|---|---|---|---|
| 1 | 982 | 77 | 2.03 | 7.01 | | 0.6 | 0.2 |
| 2 | 1,073 | 67 | 2.03 | 10.3 | | 0.6 | 0.3 |
| 3 | 1,124 | 60 | 2.03 | 13.8 | | 0.6 | 0.4 |
| 4 | 859 | 108 | 2.03 | | [1]3.6 | 0.7 | 0.2 |
| 5 | 955 | 82 | 2.03 | 9.7 | | 0.7 | 0.3 |
| 6 | 1,027 | 70 | 2.02 | 9.8 | | 0.7 | 0.4 |
| 7 | 718 | 160 | 2.04 | | [2]6.3 | 0.8 | 0.2 |
| 8 | 819 | 103 | 2.03 | | [1]5 | 0.8 | 0.2 |

[1] Between 0 and 60° C.
[2] Between 20 and 120° C.

It will be seen that the materials thus obtained have remarkable characteristics:

Small spectrum line widths for high $4\pi j_s$ values and low temperature coefficients of the $4\pi j_s$.

On the other hand, these compounds, with a high gadolinium content, possess high stability at peak power (high critical field strength $h_c$), as those skilled in the art will appreciate.

FIGS. 2 to 6 illustrate the variations in magnetization as a function of temperature, for Examples 1, 2, 3, 5 and 7 respectively.

What is claimed is:

1. Ferrimagnetic garnet compounds characterized by the general formula:

$$Y_{3-3x-y}Gd_{3x}Ca_yFe_{5-y}Sn_yO_{12}$$

where:

$$0.5 \leq x \leq 0.85$$
$$0.1 \leq y \leq 0.5$$

2. A method of manufacturing the compounds claimed in claim 1, comprising the following steps:
   (a) mixing raw materials of calcium carbonate and oxides of iron, yttrium, gadolinium and tin, having a purity greater than 99.95% in the proportions defined by the formula:

$$Y_{3-3x-y}Gd_{3x}Ca_yFe_{5-5\epsilon-y}Sn_yO_{12}$$

where $\epsilon$ is between $0.02 \leq \epsilon \leq 0.05$ and $0.5 \leq x \leq 0.85$, $0.1 \leq y \leq 0.5$, with water;
   (b) crushing for 24 hours;
   (c) drying, screening, firing in an oxidizing atmosphere, at a temperature between 1100° C. and 1200° C.; crushing, and mixing with water for a period of 48 hours; drying, screening and mixing with an organic binder;
   (d) pressing under a pressure of about 1 ton per sq. cm.;
   (e) sintering at a temperature in the order of 1400° C. to 1500° C., in an oxidizing atmosphere in a furnace, for at least 2 hours.

References Cited

UNITED STATES PATENTS 3,006,855   10/1961   Geller _____ 252—62.59 X
3,085,980   4/1963    Gorter et al. _____ 252—62.57

FOREIGN PATENTS 1,027,042   4/1966   Great Britain _____ 252—62.57

JAMES E. POER, Primary Examiner
J. COOPER, Assistant Examiner

U.S. Cl. X.R.
252—62.59, 62.63